United States Patent Office 3,539,483
Patented Nov. 10, 1970

3,539,483
ANIONIC POLYURETHANE DISPERSIONS AND A PROCESS FOR THE PRODUCTION THEREOF
Wolfgang Keberle, Leverkusen-Ludwig, and Gunter Oertel, Cologne-Flittard, Germany, assignors to Farbenfabriken Bayer Aktiengesellschaft, Leverkusen, Germany, a corporation of Germany
No Drawing. Filed Mar. 18, 1968, Ser. No. 714,028
Claims priority, application Germany, Mar. 20, 1967, F 51,876
Int. Cl. C08g 51/24; C09g 1/04
U.S. Cl. 260—29.2     7 Claims

ABSTRACT OF THE DISCLOSURE

Emulsifier-free anionic dispersions of polyisocyanate poly-addition products containing about 0.05 to about 8% by weight of $COO^{\ominus}$ groups are prepared by reacting an organic compound containing active hydrogen atoms which are reactive with NCO groups, an organic diisocyanate and an alkali metal salt or ammonium salt of a diamino carboxylic acid having the formula $$NH_2-(CH_2)_n-\underset{R'}{\overset{R'}{C}}H-\underset{R}{\overset{R}{C}}H-N-\underset{R}{\overset{R}{C}}H-\underset{R'}{\overset{R'}{C}}H-(CH_2)_n-NH_2$$
$$\overset{|}{\underset{COOM}{\overset{|}{\underset{A}{\overset{|}{CO}}}}}$$

wherein $n$ is 0 to 1, R and R' are hydrogen atoms or lower alkyl groups, A is

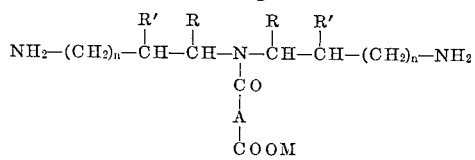

or

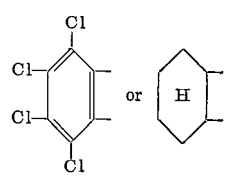

and M is lithium, sodium, potassium, rubidium or cesium, an $NH_4$, $NHR''_3$, $NH_2R''_2$ or $NH_3R''$ group wherein R is an alkyl group of 1 to 4 carbon atoms and dispersing the product in an aqueous medium. The dispersions are particularly useful as coatings and impregnations.

---

This invention relates to anionic polyurethane dispersions and a process for preparing the same. More particularly, it relates to emulsifier-free dispersions of polyurethanes utilizing as the chain extending agent a particular diamino-amide-carboxylic acid.

It is already known that aqueous polyurethane dispersions which are free from emulsifiers may be prepared from a dispersion in water of polyurethane masses which contain salt groups. These salt groups which are present in the polyurethane chains and exert an emulsifying effect, enabling dispersions to be produced without the addition of emulsifiers or other substances which assist emulsification in dispersion processes.

Various processes are now known for the introduction of salt groups into polyurethanes. The salt groups may be introduced into the polyurethane as groups in chain lengthening agents which have reactive hydrogen atoms the chain lengthening agents which contain salt groups being reacted with isocyanate-containing prepolymers. Those salt-containing chain lengthening agents which have proved to be particularly suitable are the salts of diaminocarboxylic acids which are used in the form of their alkali metal or ammonium salts.

Diaminocarboxylic acids which may be used include compounds known from the chemistry of peptides, such as ornithine and lysine. A process for the production of polyurethane dispersions using these compounds has been described in Belgian patent specification No. 673,432. The use of addition products of acrylic acid salts with diamines as anionic chain lengthening agents is also known. One disadvantage arising out of the use of these diamino carboxylic acids is that they are not easily accessible and are difficult to prepare on a commercial scale. Furthermore, both the method of preparation of these diamine carboxylic acids and that of the polyurethane dispersions obtained from them are difficult to reproduce.

The more accessible aromatic diaminocarboxylic acids are usually commercial products which as a rule are only moderately soluble in the solvents usually used and which cause the products to have a high sensitivity to light and a strong tendency to yellowing, this applies particularly to polyurethane products. Polyurethane dispersions prepared from them undergo discoloration on exposure to light and yield coatings, coverings and foils which are not light fast.

It is therefore an object of this invention to prepare accurately reproducible and light fast dispersions. It is another object to prepare polyurethane dispersions, from diaminocarboxylic acids, which are economical and technically easily accessible. It is still another object to provide a method of preparing such dispersions.

The foregoing objetcs and others which will become apparent from the following description are accomplished in accordance with the invention, generally speaking, by providing accurately reproducible and light fast, emulsifier-free dispersions, especially polyurethane dispersions, can be prepared by using as anionic chain lengthening agent the readily accessible salts of diamino-amide-carboxylic acids of the formula $$NH_2-(CH_2)_n-\underset{R'}{\overset{R'}{C}}H-\underset{R}{\overset{R}{C}}H-N-\underset{R}{\overset{R}{C}}H-\underset{R'}{\overset{R'}{C}}H-(CH_2)_n-NH_2$$
$$\overset{|}{\underset{COOM}{\overset{|}{\underset{A}{\overset{|}{CO}}}}}$$

wherein $n$ is 0 or 1, R and R' are hydrogen atoms or low alkyl groups having 1 to 6 carbon atoms and preferably methyl and ethyl groups, A is $-CH_2-CH_2-$, $$-CH_2-CH_2-CH_2-$$

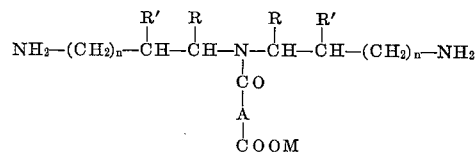

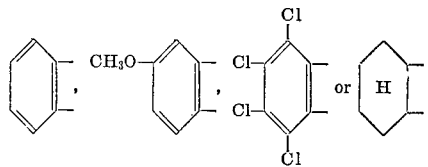

and M is a lithium, sodium, potassium, rubidium, cesium atom or an $NH_4$, $NHR''_3$, $NH_2R''_2$ or $NH_3R''$ group wherein R'' is an alkyl group having 1 to 4 carbon atoms. The dispersions prepared from the salts of these diamonoamide-carboxylic acids can easily be prepared very economically and enable light-fast films, foils, filaments, coatings, impregnations, adhesions and intermediate layers to be produced.

The invention thus relates to a process for the production of aqueous, emulsifier-free anionic dispersions of polyadducts obtained by the isocyanate polyaddition process, which polyadducts contain 0.05 to 8% by weight of $COO^{\ominus}$ groups (based on the polyadduct), by reacting higher and/or lower-molecular weight compounds having several reactive hydrogen atoms, diisocyanates and alkali metal or ammonium salts of diaminocarboxylic acids and converting them in known manner into aqueous dispersions, characterized in that the salts of diaminocarboxylic acids used are those of the general formula:

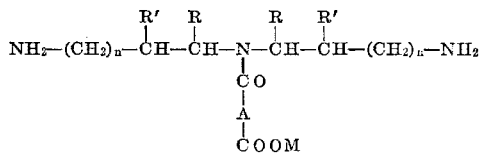

in which n, R, R', A and M have the meanings already indicated.

The alkali metal or ammonium salts of diamino-amide-carboxylic acids to be used in the process according to the invention are prepared e.g. by addition of cyclic dicarboxylic acid anhydrides such as phthalic acid anhydride, methoxy phthalic acid anhydride, maleic acid anhydride, succinic anhydride, tetrachlorophthalic acid anhydride, di-, tetra- and hexahydrophthalic acid anhydride to di-(cyanoalkyl)-amines such as imino-bis-propionitrile or imino-bis-isobutyronitrile and are converted into the salt form by the addition of alkalis, ammonia or primary, secondary or tertiary amines such as sodium hydroxide, potassium hydroxide, lithium hydroxide, sodium carbonate, sodium bicarbonate, potassium carbonate, the corresponding lithium, rubidium and cesium, triethylamine, tributylamine or triisopropylamine, followed by hydrogenation of the nitrile groups. The following are examples of the compounds to be used in the process of the present invention:

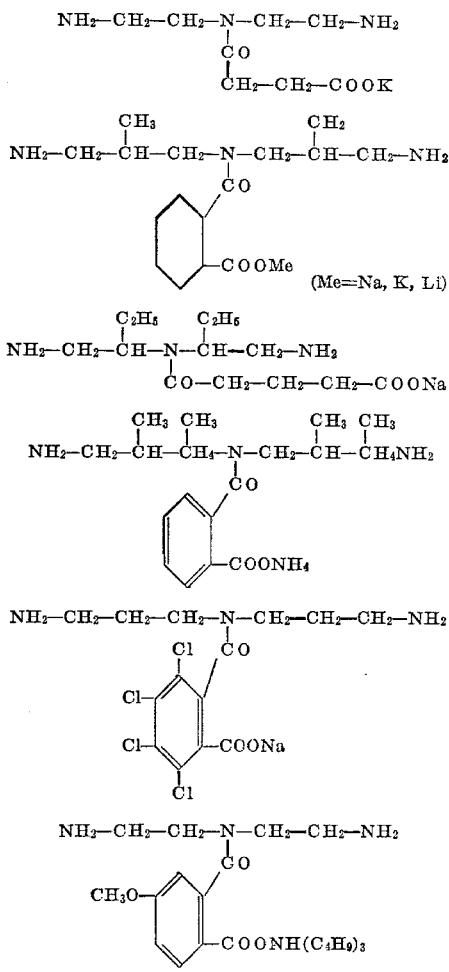

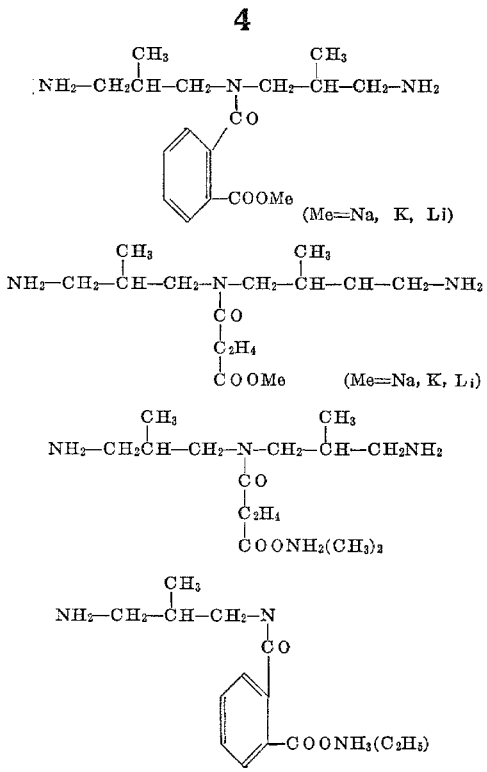

Preferred compounds are those with n=1, R=hydrogen, R'=methyl, A=ethylene, phenylene or cyclohexylene and Me=sodium, potassium or lithium.

Starting components which may be used in the preparation of the dispersions according to the invention include, the higher molecular weight and low molecular weight compounds containing reactive hydrogen atoms and polyisocyanates mentioned in French patent specification No. 1,416,463 and in Belgian patent specification 673,432.

The polyurethane polyaddition products are prepared by reacting an organic compound containing active hydrogen atoms and having a molecular weight of from about 300 to about 20,000 and preferably from about 600 to about 4,000, including those having hydroxyl, carboxyl, amino and/or mercapto groups and are preferably substantially linear. Such compounds include for example polyesters, polyethers, polyacetals, polyhydric polythioethers and the like, which have an hydroxyl number of from about 10 to about 100 and preferably from about 50 to about 70.

Preferred organic compounds containing active hydrogen atoms are those with terminal hydroxyl and primary amino groups.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like.

Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like.

Any suitable amino alcohol such as, for example, b-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bishydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Pat. No. 1,922,459.

Any suitable polyhydric polythioether may be used such as, for example, the reaction product of one of the aforementioned akylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(b-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

In addition to the high molecular weight organic compounds containing active hydrogen atoms it is at times desirable to use chain extending agents in addition to the diamino-amide-carboxylic acids mentioned above. Any suitable chain extending agent containing active hydrogen atoms which are reactive with NCO groups and having a molecular weight less than about 300 may be used such as, for example, water, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2 - chloroaniline), 3,3 - dichloro-4,4'-biphenyl diamine, 2,6-diaminopyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene disulfonic acid dihydrazide, omega-amino-capronic acid dihydrazide, gamma-hydroxy butyric hydrazide, bis-semi-carbazide, bis-hydrazine carbonic esters of glycols such as any of the glycols heretofore mentioned and the like. The reaction may also be carried out in the complete absence of these low molecular weight compounds.

In the preparation of the emulsifier-free polyaddition dispersions any suitable organic diisocyanate may be used in reaction with the organic compound containing active hydrogen atoms such as, for example, ethylene diisocyanate, ethylidene diisocyanate, propylene diisocyanate, butylene diisocyanate, hexamethylene diisocyanate, cyclopentylene - 1,3 - diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenyl propane-4,4'-diisocyanate, p-phenyline diisocyanate, m-phenylene diisocyanate, xylene diisocyanate, 1,4-naphthylene diisocyanate, 1,5-naphthylene diisocyanate, diphenyl-4-4'-diisocyanate, azobenzene - 4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred to use aliphatic diisocyanates to obtain polyurethane compositions that will not discolor in the light.

In order to vary the resistance to water, the handle, the surface properties and gloss of impregnations, coatings, covering and adhesions obtained from the products of the process, it is often advantageous to replace the higher molecular weight compounds which contain reactive hydrogen atoms and have a molecular weight of 300 to 20,000 either partly or completely by carbofunctional polysiloxanes which contain reactive hydrogen atoms and have a molecular weight of about 300 to 20,000, preferably 600 to 4,000.

These carbofunctional polysiloxanes, and the preparation thereof have been described e.g. in French patent specifications Nos. 1,291,937, 1,481,512, 1,505,790 and in German Auslegeschrift 1,114,632.

In the process of preparation of the aqueous, emulsifier-free dispersions, especially polyurethane dispersions, according to the invention, a prepolymer containing isocyanate groups is first prepared from the compound containing reactive hydrogen atoms which has a molecular weight of 300 to 20,000, preferably 600 to 4,000, organic diisocyanates and, if used, the low molecular weight chain extending compounds with reactive hydrogen atoms, and this prepolymer is reacted in organic solutions with the salt of amido-containing diamino-carboxylic acid to be used according to the invention, which salt may be present in solution. The resulting, predominantly linear or branched, high molecular weight anionic polyaddition products especially polyurethanes, are converted into the aqueous phase by the addition of water, and at the same time or immediately thereafter the organic solvent is completely or partly removed.

When higher and/or low molecular weight compounds containing amino groups are used as starting material, it is also possible to react all the components together in organic, or mixed aqueous-organic or aqueous solution. In principle, one may also first introduce the salt of the amido-containing diaminocarboxylic acid in aqueous solution into the reaction vessel and stir into this the isocyanate-containing prepolymer. Alternatively, all the water, together with the salt of the amido-containing diaminocarboxylic acid may be added to the isocyanate-containing prepolymer.

The solvent used for the isocyanate-containing prepolymer is preferably a low boiling organic solvent such as acetone, tetrahydrofuran, methylethyl ketone and tertiary butanol, and one may even use low boiling solvents that are not miscible with water, such as benzene or methylene chloride.

One may use low boiling alcohols such as methanol and ethanol or water, if desired together with the other organic solvents as solvent for the salt of the amido-containing diamino-carboxylic acid. The isocyanate-containing prepolymer is, as a rule prepared at elevated temperatures, temperatures of between 110 and 130° C. being used for aliphatic diisocyanates. For aromatic diisocyanates, temperatures of 60–100° C. are generally sufficient. For the preparation of the prepolymer the quantity of diisocyanate is preferably so chosen that all the groups capable of reacting with isocyanate groups will undergo reaction; in addition, a slight excess of diisocyanate may be used. In general, the ratio of isocyanate groups to the groups that are reactive with isocyanate groups is not greater than 1.3.

When the melt has cooled, the prepolymer is taken up in the organic solvent and treated at 20 to 80° C. with the salt of the amido-containing diamino-carboxylic acid, which salt may be present in solution. If the reaction mixture becomes very highly viscous during the preparation of the prepolymer, solvents such as acetone, tetrahydrofuran of methylethylketone may be added.

The proportion of carboxylic groups —COO$^\ominus$ in the polyaddition product or polyurethane amounts to 0.05 to 8, preferably 0.5 to 4 percent by weight. The amounts of amido-containing diamino-carboxylic acids to be used should be chosen accordingly. The carboxylate group content can thus be chosen within wide liimts, but it should not fall below the above-mentioned lower limit because otherwise the stability of the dispersions, which according to the invention are prepared without the use of auxiliary agents such as emulsifiers, dispersing agents or swelling agents, will be impaired.

To convert the reaction product into the aqueous phase, the organic solvent is removed by distilling off or blowing it out, e.g. at temperatures between 30 and 80° C. The solvent is advantageously blown off in vacuo.

In this way one can obtain aqueous dispersions in the form of non-sedimenting latices of low to high viscosity having an average particle size of 0.02 to 1.0$\mu$, preferably 0.05 to 0.2$\mu$ and a solids content of 20 to 60%.

The dispersions according to the invention are stable and can be stored and transported, and can be shaped at any subsequent time.

The solid particles in the dispersion have a molecular weight in the film and fibre molecular range. This range includes molecular weights from about 10,000 up to about 2,000,000.

The dispersions generally dry out at room temperature or higher temperatures, directly forming dimensionally stable foils and coatings. Higher temperatures are preferred for drying. The dispersions according to the invention may in addition afterwards be cross-linked, e.g. by polyfunctional substances which have a cross-linking action, such as formaldehyde or compounds which liberate or react like formaldehyde, e.g. hexamethylolmelamine or carbamide resins, or by means of phenolic resins, masked polyisocyanates or polyepoxides. Cross-linked coatings, impregnations and adhesive layers are thereby obtained.

Dispersions according to the invention are used, mainly as coatings and impregnations for all sorts of different substrates such as paper, cardboard, textiles, leather, fleeces, wood and metals as bond agents, binders and adhesives and for the production of filaments, films and foils. The shaped articles, coatings and impregnations obtained from the dispersions are distinguished by their good resistance to water and oil and have the advantage of being softer than the products produced according to Belgian patent specification No. 673,432 with the use e.g. of ornithine or lysine.

The dispersions may be blended with anionic polymer or copolymer dispersions, for example of vinyl chloride, ethylene styrene, butadiene, vinylidenechloride, vinyl acetate, acrylate and acrylonitrile. Fillers, plasticisers, pigments, carbon black, aluminum or dispersions of clay, asbestos or tar may also be incorporated in the dispersions.

The invention will be further illustrated by the following examples in which parts are by weight unless otherwise specified.

PREPARATION OF THE DIAMINOCARBOXYLIC ACIDS TO BE USED ACCORDING TO THE INVENTION (A) 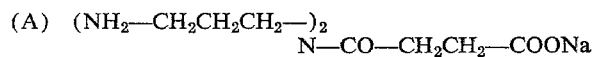

About 123 parts of di-(2-cyanoethyl)amine are added dropwise at about 10 to about 20° C. with cooling, a suspension of about 100 parts of succinic anhydride in about 200 parts by volume of ethanol. The reaction mixture is then stirred for about 1 hour at about 20 to about 40° C., a clear solution being first formed from which a colorless crystalline paste is rapidly formed. The resulting crystals of succinic acid N-di-(2-cyanoethyl) amide are then filtered under suction and dried (yield: 159 parts colorless crystals, M.P. 112–114° C.).

About 111.5 parts of the resulting amido acid are dissolved in about 600 parts by volume of methanol with heating. About 20 parts of sodium hydroxide powder are added to the solution to neutralize the acid, and the solution is diluted with about 150 parts by volume of methanol. The resulting sodium salt of the amido acid is then catalytically hydrogenated in an autoclave equipped with stirrer at about 80° C. in the presence of about 25 parts of Raney cobalt at a hydrogen pressure of about 150 excess atmospheres. When the theoretical quantity of hydrogen has been taken up, the pressure is released, the catalyst is removed by filtration and the resulting pale yellow solution is evaporated under reduced pressure. About 134 parts of the sodium salt of the diamino amido acid of the above formula remain behind in the residue in the form of a reddish oil. The amino content is determined by titration with 1 N hydrochloric acid. The yield is 95% of the theoretical amount.

(B) 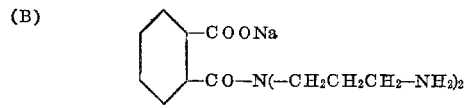

About 123 parts di-(2-cyanoethyl)amine are poured dropwise into a solution of about 148 parts phthalic acid anhydride in about 200 parts by volume of acetone the temperature of the solution rising to from about 20° C. to about 50° C. The reaction mixture is then stirred for about 1 hour at about 50° C. and the pale yellow solution is then evaporated in vacuo. About 280 parts of a viscous yellow oil remain in the residue, which oil crystallizes when left to stand for some time. The crystals of the resulting amido acid melt at 139 to 140° C. after they have been washed with ethyl acetate and dried (yield: 215 parts colorless crystals).

About 100 parts of the amido acid obtained according to the above method are dissolved hot in 400 parts by volume of ethanol and then treated with about 14.8 parts NaOH powder, and after dilution with a further 200 parts by volume methanol, they are hydrogenated catalytically in the presence of about 20 parts of Raney cobalt at about 80° C. under a hydrogen pressure of about 150 excess atmospheres. After removal of the catalyst a yellow solution is obtained which is concentrated by evaporation under vacuum. About 110 parts of the sodium salt of the diamino-amido acid remain behind in the residue in the form of a reddish, highly viscous oil. The amino content is determined with 1 N hydrochloric acid. It amounts to 86% of theoretical.

Example 1

About 250 parts of a polyester of adipic acid and ethylene glycol (OH number 56) are dehydrated at about 120° C. for about 30 minutes and then reacted for about 2 hours with 38 parts 1,6-hexanediisocyanate at about 120° C. This isocyanate-containing prepolymer is cooled to about 55° C. and taken up in about 700 parts by volume acetone. A solution of about 15.8 parts sodium succinate bis-N,N-(γ-aminopropyl)amide (prepared as in A) in about 80 parts by volume water is added to this acetonic solution of prepolymer with rapid stirring. About 450 parts by volume of water are then stirred in. The reaction mixture is then stirred until the streakiness which at first appears has disappeared and the mixture has become homogeneous. The acetone is distilled off under suction at a water jet at about 55° C. The resulting dispersion has a solids content of 44% and a residual acetone content of 0.5%.

Example 2

About 425 parts of a polyester of adipic acid, 1,6-hexanediol and neopentyl glycol (molar ratio 30:22:12; OH number 66.6) are dehydrated for about 30 minutes at about 120° C. and then reacted for about 2 hours with about 76 parts of 1,6-hexanediisocyanate at about 120° C. The isocyanate-containing prepolymer is cooled and taken up in about 1500 parts by volume of acetone. To this prepolymer solution are added about 37.6 parts of sodium phthalate-bis-N,N-(γ-aminopropyl)amide (prepared as in B) in about 150 parts by volume of water. The reaction mixture is then briefly stirred and about 700 parts by volume of water are added and the acetone is removed under vacuum. The resulting dispersion has a solids content of 42%.

Example 3

250 g. of a polyester of adipic acid and ethylene glycol (OH number 56) are dehydrated at 120° for 30 minutes and then reacted for two hours at 120° with 41 g. of the isomer mixture of methyl cyclohexane diisocyanate (2,4-diisocyanate: 2,6-diisocyanate 80:20). The prepolymer melt is cooled to 55° C. and taken up in 700 ml. of acetone. A solution of 15. 8 g. sodium succinate-bis-N,N-(γ-aminopropyl)-amide (prepared as in A) in 80 ml. of water is added to this acetonic solution while stirring rapidly. 500 ml. of water are then stirred in. The acetone is distilled off under a water jet vacuum at 55° C. The resulting dispersion has a solids content of 37% and dries to smooth and solid coatings.

Example 4

The process is as in Example 3, but using instead of the polyester 250 g. of polypropylene glycol ether (OH number 56). Prepolymer reaction takes place instead at 120° to 130°. A stable dispersion with a solids content of 37.4% is obtained yielding after drying a soft, slightly sticky film.

Example 5

314.8 g. of the hydroxyl groups containing, carbofunctional polysiloxane of the average formula HOCH$_2$—Si(CH$_3$)$_2$—O—[Si(CH$_3$)$_2$O]$_{12}$—Si(CH$_3$)$_2$—CH$_2$OH with 2.7% OH are mixed after dehydration at 120° with 82 g. of 1.6-hexane diisocyanate at 90° and reacted at 100° for two hours. After cooling to 50° the liquid reaction mass is taken up in 1000 ml. of acetone. A solution of sodium succinate bis-N,N-(γ-aminopropyl)-amide (prepared as in B) in 160 ml. of water is added to this acetonic solution. After short stirring 600 ml. of water are added while stirring. The acetone is distilled off in vacuo. The obtained dispersion has a solids content of 41.7% and yields a wax-like film after drying.

The examples set forth immediately above are for the purpose of illustration and not limitation. It is to be understood that any of the active hydrogen compounds set forth above and any of the organic polyisocyanate, chain extenders and diamino-amide carboxylic acid salts may be used in equivalent amounts for those particularly used in the examples.

Although the invention has been described in considerable detail in the foregoing for the purpose of illustraiton, it is to be understood that such detail is solely for this purpose and that variations can be made by those skilled in the art without departing from the spirit and scope of the invention except as is set forth in the claims.

What is claimed is:

1. Aqueous, emulsifier-free anionic dispersions of polyurethane polyaddition products which comprises a dispersion in aqueous medium of a polymer having the repeating units

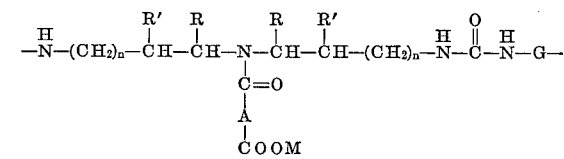

wherein G is the residue remaining after removal of the NCO groups from an NCO terminated prepolymer prepared by reacting an organic compound containing active hydrogen atoms which are reactive with NCO groups and having a molecular weight of from about 300 to about 20,000 with an organic diisocyanate; n is 0 to 1, R and R' are hydrogen atoms or lower alkyl groups having 1 to 6 carbon atoms; A is —CH$_2$—CH$_2$—, —CH$_2$—CH$_2$—CH$_2$—,

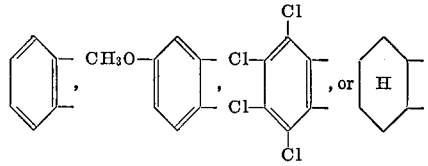

and M is a lithium, sodium, potassium, rubidium or cesium atom or an NH$_4$, NHR''$_3$, NH$_2$R''$_2$ or NH$_3$R'' group wherein R'' is an alkyl group having 1 to 4 carbon atoms, said polymer having a molecular weight in the film and fiber molecular range and from about 0.05 to about 8% by weight of COO$^\ominus$ groups.

2. The aqueous dispersions of claim 1 wherein in addition to the active hydrogen containing compound having a molecular weight of from about 300 to about 20,000 a chain extending agent containing active hydrogen atoms and a molecular weight less than 300 is used in the preparation of the polymer.

3. The aqueous dispersion of claim 1 wherein the organic compound contained active hydrogen atoms which are reactive with NCO groups has a molecular weight of from about 600 to about 4,000.

4. The aqueous dispersions of claim 1 wherein a portion of the organic compound having active hydrogen atoms and a molecular weight of 300 to 20,000 is replaced by a carbo-functional polysiloxane having active hydrogen atoms that are reactive with NCO groups.

5. The aqueous dispersions of claim 1 wherein in the formula of the repeating units n is 1, R is hydrogen, R' is methyl, A is ethylene, phenylene or cyclohexylene and M is lithium, sodium or potassium.

6. A process for the preparation of the compositions of claim 1 which comprises reacting an NCO terminated prepolymer prepared by reacting an organic compound containing active hydrogen atoms which are reactive with NCO groups and having a molecular weight of from about 300 to about 20,000 with an organic diisocyanate, with a salt of diamino carboxylic acid having the formula

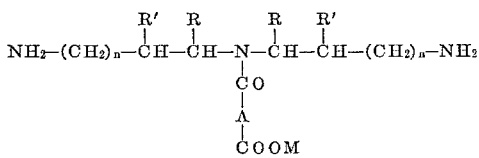

wherein $n$ is 0 to 1, R and R' are hydrogen or lower alkyl groups having 1 to 6 carbon atoms, A is $-CH_2-CH_2-$, $-CH_2-CH_2-CH_2-$,

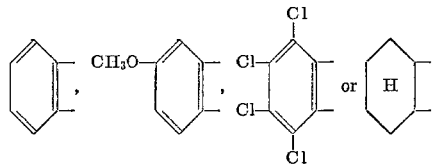

and M is a lithium, sodium, potassium, rubidium or cesium atoms or an $NH_4$, $NHR''_3$, $NH_2R''_2$ or $NH_3R''$ group wherein R'' is an alkyl group having 1 to 4 carbon atoms and dispersing the resulting polymer in water.

7. The process of claim 6 wherein in the formula of the salt of diamino carboxylic acid $n$ is 1, R is hydrogen, R' is methyl, A is ethylene, phenylene or cyclohexylene and M is lithium, sodium or potassium.

References Cited
UNITED STATES PATENTS 3,023,193   2/1962   Thoma et al. _____ 260—29.2

JULIUS FROME, Primary Examiner

A. H. KOECKERT, Assistant Examiner

U.S. Cl. X.R.

117—155; 260—29.3, 29.4, 29.6, 75, 77.5